United States Patent [19]

Yamazaki

[11] Patent Number: 4,963,801
[45] Date of Patent: Oct. 16, 1990

[54] MOTOR DRIVING CIRCUIT FOR SELECTIVITY DRIVING DIFFERENT MOTOR TYPES

[75] Inventor: Shohei Yamazaki, Hamamatsu, Japan
[73] Assignee: Yamaha Corporation, Hamamatsu, Japan
[21] Appl. No.: 230,256
[22] Filed: Aug. 9, 1988
[30] Foreign Application Priority Data
  Aug. 11, 1987 [JP] Japan .................. 62-122834[U]
[51] Int. Cl.$^5$ ........................................... H02P 5/16
[52] U.S. Cl. ............................. 318/254; 318/568.18
[58] Field of Search ............ 318/721, 286, 254, 280, 318/568.18, 574, 513, 576, 4, 638, 544; 388/814, 815, 820, 845

[56] References Cited
U.S. PATENT DOCUMENTS 4,240,014  12/1980  Müller ........................ 388/814 X
4,701,839  10/1987  McNally et al. .............. 318/721 X
4,763,049  8/1988   Magee ......................... 318/254
4,774,445  9/1988   Penkar ....................... 318/568.18
4,829,219  5/1989   Penkar ....................... 318/568.18

Primary Examiner—William M. Shoop, Jr.
Assistant Examiner—A. Jonathan Wysocki
Attorney, Agent, or Firm—Spensley Horn Jubas & Lubitz

[57] ABSTRACT

A motor driving circuit capable of driving a motor with a single circuit regardless of whether the motor used is a brush motor or a brushless motor. The circuit detects a speed error between actual speed and commanded speed of the motor and provides a speed error signal. An inversion circuit selectively inverts or non-inverts the speed error signal in response to the type of the motor and desired motor rotation direction. When a brushless motor is used, the non-inverted error signal is employed for controlling driving of the motor. When a brush motor is used, the inverted speed error signal is employed.

5 Claims, 8 Drawing Sheets

MOTOR DRIVING CIRCUIT FOR SELECTIVITY DRIVING DIFFERENT MOTOR TYPES

BACKGROUND OF THE INVENTION

This invention relates to a motor driving circuit and, more particularly, to a motor driving circuit capable of driving a motor with a single common circuit, e.g., a single integrated circuit, regardless of whether the motor to be driven is a brush motor or a brushless motor.

Speed and rotation direction controls are necessary for motors of certain types such as a capstan motor in a DAT (digital audio tape recorder) to cope with modes of operation such as normal speed playback and double speed playback or fast forward rotation and fast reverse rotation. Speed control is necessary for a drum motor and a reel motor to cope with normal speed playback, double speed playback and high speed search.

As these motors, a brush motor or a brushless motor is used depending upon the purpose of the motor. Since a brush motor and a brushless motor are driven by different methods of driving, a drive circuit proper to a motor to be used must be designed after the type of the motor has been determined.

In a case where a brush motor is used, a drive signal of characteristics shown in FIG. 2 is used. In this drive signal, the rotation direction is determined by polarity of voltage and the speed is determined by the absolute value of voltage. In a case where a brushless motor is used, a drive signal of characteristics shown in FIG. 3 is used. In this drive signal, the speed is determined by the absolute value of voltage and the rotation direction is determined by a separate rotation direction command.

In designing a motor driving circuit, according to the conventional method, whether the motor to be used is a brush motor or a brushless motor is first determined and a motor driving circuit producing a drive signal as shown in FIG. 2 or FIG. 3 is designed depending upon the type of the motor to be used. It is a recent tendency to design such motor driving circuit with an integrated circuit and, in this case, an integrated circuit adapted to the type of the motor to be used must be selected or an external circuit must be additionally provided.

Thus, the necessity for selecting a driving circuit depending upon the type of the motor to be used prevents application of an integrated circuit to general uses.

It is, therefore, an object of the invention to provide a motor driving circuit capable of adapting both to a brush motor and a brushless motor whereby scope of application of an integrated circuit employing this motor driving circuit can be broadened.

SUMMARY OF THE INVENTION

For achieving the above described object, the motor driving circuit according to the invention comprises a motor type selection circuit for producing a signal representing a type of motor which has been selected, a motor speed detection circuit for producing a speed detection information signal corresponding to the rotation speed of said motor, a motor speed command circuit for producing a motor speed command signal, a motor rotation direction command circuit for producing a motor rotation direction command signal, a speed error detection circuit for detecting a speed error between actual speed and commanded speed of said motor in response to the speed detection information signal and the speed command signal and producing a speed error signal in accordance with result of the detection, and an inversion circuit connected to the output side of said speed error detection circuit for selectively inverting or non-inverting the speed error signal in response to states of the signal representing the type of the motor and the motor rotation direction command signal, said motor being driven by the motor rotation direction command signal and the output of said inversion circuit.

According to the invention, a driving circuit for a brushless motor is realized by utilizing the speed error and the rotation direction command and a driving circuit for a brush motor is realized by utilizing a signal obtained by inverting the speed error with the rotation direction command. Accordingly, both the brush motor and brushless motor can be driven with the same driving circuit, e.g., the same integrated circuit so that the scope of application of the circuit is broadened.

An embodiment of the invention will now be described with reference to the accompanying drawings.

BRIEF DESCRIPTION OF THE DRAWINGS

In the accompanying drawings.

DESCRIPTION OF A PREFERRED EMBODIMENT

Figure 1:
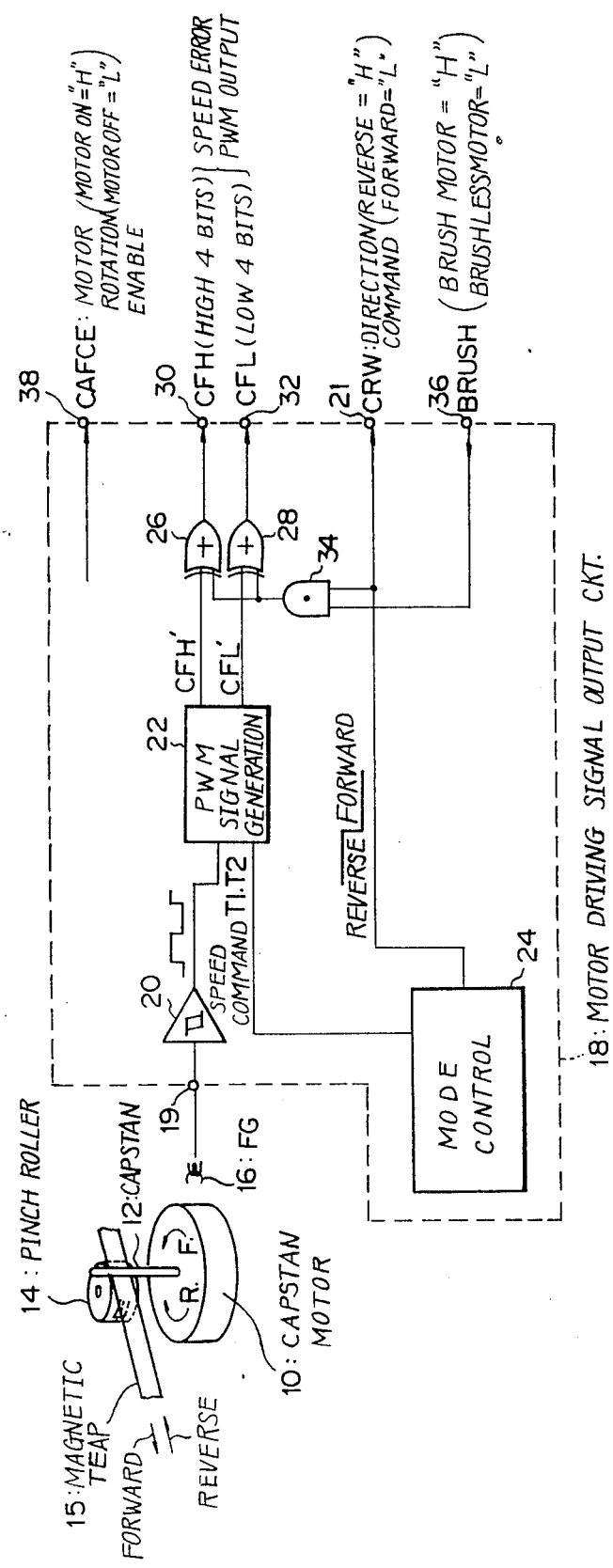
FIG. 1 is a block diagram showing an embodiment in which the invention is applied to an R-DAT.
Figure 2:
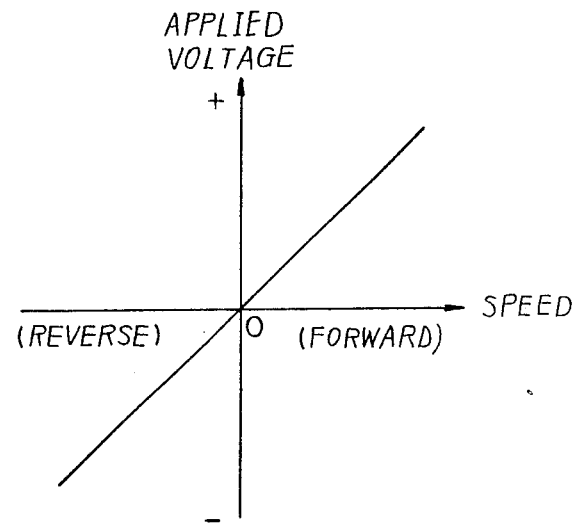
FIG. 2 is a diagram showing the principle of operation of a brush motor.
Figure 3:
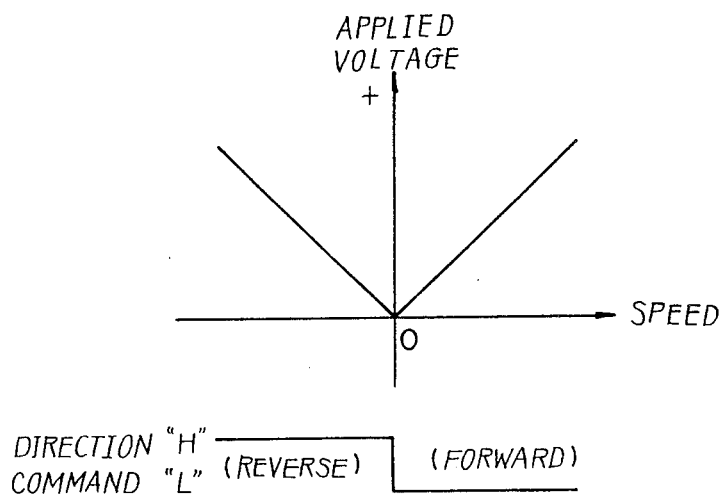
FIG. 3 is a diagram showing the principle of operation of a brushless motor.

FIG. 1 shows an embodiment in which this invention is applied to driving of a capstan motor of an R (rotary head type) - DAT. In a capstan motor 10, a motor shaft 12 functions as the capstan. A pinch roller 14 is in abutting engagement with the capstan 12 and a tape 15 is caused to run between the capstan 12 and the pinch roller 14. The running direction of the tape 15 is changed by rotating the motor 10 forwardly or reversely and the running speed of the tape 15 is changed by changing the rotation speed of the motor 10. For this motor 10 can be used both a brush motor and a brushless motor.

An FG (frequency generator) 16 is provided for the rotation speed detection of the capstan motor 10. The FG 16 generates a pulse signal at a period determined by equally dividing one revolution of the motor 10. The period of this pulse signal constitutes speed detection information. This pulse signal does not contain rotation direction detection information.

A motor driving signal output circuit 18 is constructed of an integrated circuit.

The output pulse of the FG 16 is applied from an input terminal 19 to the motor driving signal output circuit 18, wave-shaped by a Schmidt circuit 20 and then applied to a PWM signal generation circuit 22.

Figure 4:
FIG. 4 is a waveform diagram showing direction command CRW in FIG. 1.

A mode control circuit 24 produces a direction command CRW ordering forward rotation or reverse rotation of the motor 10 and time information T1, T2 constituting a rotation speed command in accordance with operation modes such as normal speed playback and double speed playback. As shown in FIG. 4, the direction command CRW becomes "H" when reverse direction is ordered and "L" when forward rotation is ordered. The direction command CRW is directed to an output terminal 21 for driving a brushless motor.

The PWM signal generation circuit 22 compares the speed of the motor 10 detected from the FG output pulse with the speed command for the motor 10 provided by the time information T1, T2 generated by the mode control circuit 24 and thereupon produces PWM signals CFH' and CFL' whose duty ratio changes in accordance with speed. error between the detected speed and the speed command.

The PWM signals CFH' and CFL' are applied to exclusive OR gates 26 and 28. An AND gate 34 causes outputs of the exclusive OR gates to be inverted when the direction command CRW is "H" (reverse rotation) and a brush motor/brushless motor selection signal BRUSH is "H" (i.e., brush motor selection) applied from an input terminal 36. Output PWM signals CFH and CFL of the exclusive OR gates 26 and 28 are directed to output terminals 30 and 32 for driving the motor 10. Since the motor applied with the PWM signals is driven at average level of the PWM signals, the rotation speed of the motor increases as the duty ratio of the PWM signals increases.

A motor rotation enable signal CAFCE becomes "H" when motor rotation is enabled and "L" when it is disabled and provided from an output terminal 38.

Figure 5:
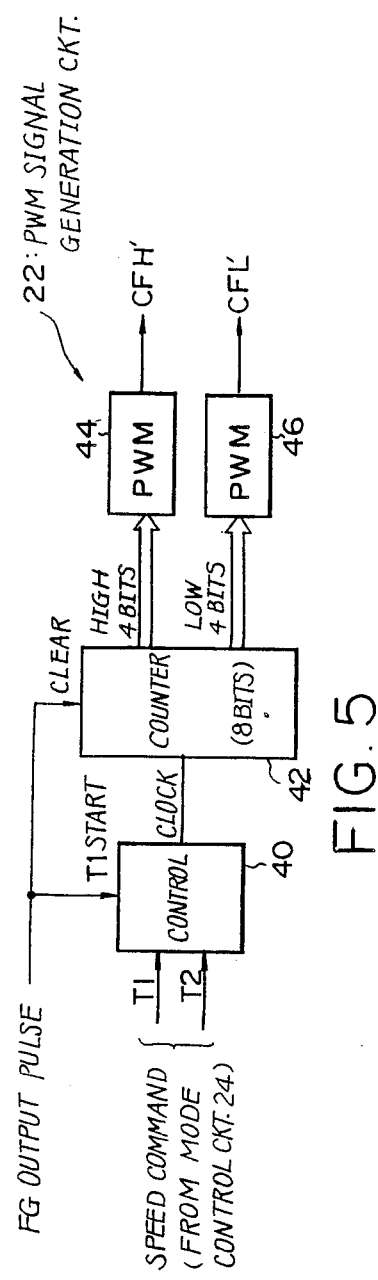
FIG. 5 is a block diagram showing a specific example of PWM signal generation circuit 22 in FIG. 1.

A specific example of the PWM signal generation circuit 22 is shown in FIG. 5. A control circuit 40 receives the time information T1, T2 as the speed command from the mode control circuit 24 and the FG output pulse for detection of the rotation speed. The control circuit 40 starts to generates a clock signal upon a lapse of the time T1 after the FG output pulse is applied and starts to generate a clock signal at the time the next FG output pulse is applied. A counter 42 is counted up by this clock signal and cleared each time the FG output pulse is provided. The time information T1, T2 and the period of the clock signal are determined at such values that the count of the counter 42 immediately before being cleared becomes a predetermined count when the period of the FG output pulse is a regular period (i.e., speed error is zero) and, accordingly, the speed error is known by the count value immediately before being cleared.

The counter 42 consists of 8 bits and is capable of counting 256 times from 0 to 255. Upon reaching the count to 255, the count stops at 255 even if the clock signal is applied further.

PWM circuits 44 and 46 receive 4 higher order bits and 4 lower order bits of the count (8 bits) of the counter 42 immediately before being cleared and outputs PWM signals CFH' and CFL' having duty ratios corresponding to the respective values.

Figure 6:
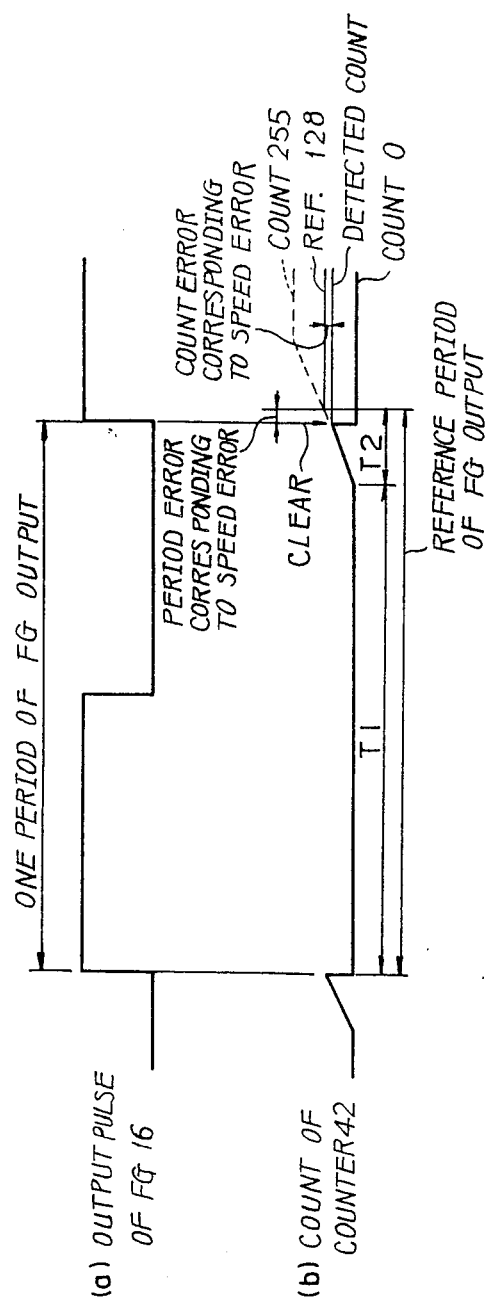
FIG. 6 is a diagram showing a speed error detection operation by a counter 42 in FIG. 5.

The speed error detection operation by the counter 42 is explained with reference to FIG. 6. Upon lapse of time T1 after resetting of the counter 42 by the FG output pulse, counting up is started by a clock signal of a predetermined period and the counter 42 is cleared by rising of next FG output pulse. In the counter 42, count 128 which is half of the maximum count is set as reference value and length of time from starting of counting to reaching count 128 is given as the time T2. T1+T2 constitutes reference period of the FG output. Accordingly, when the period of the FG output coincides with this reference period (i.e., when there is no speed error), the counter 42 is cleared at count 128. If the detected speed is higher than the regular speed, the period of the FG output pulse is shortened so that the counter 42 is cleared at a smaller count than 128 whereas if the detected speed is lower than the regular speed, the period of the FG output is prolonged so that the counter 42 is cleared at a larger count than count 128. Accordingly, the speed error can be detected by the count of the counter 42 immediately before the counter 42 is cleared.

Since the speed of the capstan motor 10 must be changed depending upon the operation mode, the reference period T1+T2 is adjusted depending upon the operation mode. An example of setting of the reference frequency of the FG output, the reference period T1+T2 and time T1, T2 in respective operation modes is shown in the following Table 1:

TABLE 1

| Operation mode | Reference frequency (Hz) of FG output | Reference period T1 + T2 (mS) of FG output | T1(mS) | T2(mS) |
|---|---|---|---|---|
| Recording & playback (0.5 TP) | 200 | 5.00 | 3.26 | 1.74 |
| Recording & playback (1 TP) | 400 | 2.50 | 2.06 | 0.44 |
| Playback (1.5 TP) | 600** | 1.67 | 1.45 | 0.22 |
| 4.5 multiple speed playback (0.5TP) | 900 | 1.11 | 1.00 | 0.109 |
| same (1 TP) | 1800 | 0.556 | 0.529 | 0.027 |
| same (1.5 TP) | 2700 | 0.370 | 0.357 | 0.013 |

Remarks
0.5 TP: long time mode
1 TP: standard mode
1.5 TP: prerecorded tape mode (wide track)

In any mode, the period of the clock signal used for counting up is determined so that time from start of counting up till reaching count 128 becomes T2.

According to Table 1, the time T2 decreases as the reference time T1+T2 decreases (T1 and T2 are determined so that $(T1+T2)^2/T2$ becomes substantially constant). If the time T2 is made constant (i.e., if the period of the clock used for counting up is made constant), ratio of the speed error to the count varies so that the gain of the speed servo loop varies with resulting variation in the servo characteristics. By determining the values of times T1, T2 in accordance with the reference period T1+T2 so that $(T1+T2)^2/T2$ becomes substantially constant and determining the period of the clock signal used for counting up so that the count reaches the reference count 128 at the time T2, constant servo characteristics can be achieved in each operation mode.

Figure 7:
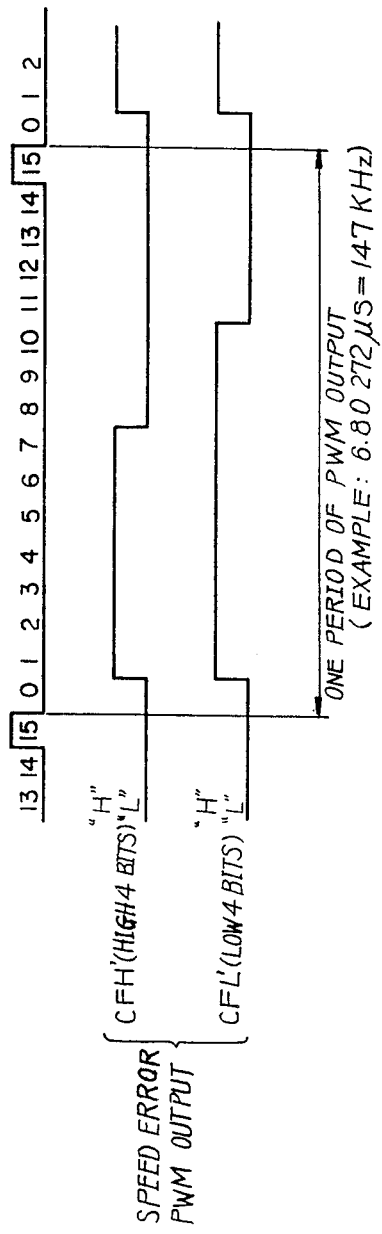
FIG. 7 is a diagram showing an example of output PWM signals of PWM circuits 44 and 46 in FIG. 5.

The operations of the PWM circuits 44 and 46 of FIG. 5 generating the PWM signals in accordance with the speed error detected by the counter 42 in the foregoing manner will now be described with reference to FIG. 7. As described above, the PWM circuits 44 and 46 generate the PWM signals from the higher order 4 bits and the lower order 4 bits derived by dividing the 8 bit output of the counter 42. These PWM signals are provided as signals obtained by dividing one period of the PWM signal (e.g., 6.80272 $\mu$in case the frequency of the PWM signal is 147 KHz) by 16 which is a numerical value which can be expressed with 4 bits and maintaining "H" state during periods of time corresponding to numerical values of the higher order 4 bits and lower order 4 of the counter 42. In the example of FIG. 7, PWM signals when the count of the higher order 4 bits is 7 and the count of the lower order 4 bits is 10 are shown. This corresponds to $7\times16+10=122$ counts as the count of the counter 42 and, in this case, the detected period is shorter than the count 128(the higher order 4 bits are 8 and the lower order 4 bits are 0) which is the reference period, i.e., the detected speed is higher than the regular speed.

By the above described arrangement, the PWM signals CFH′ and CFL′ having duty ratio corresponding to the count of the counter 42 (i.e., the speed of the motor 10) are repeatedly obtained. The PWM signals CFH′ and CFL′ are repeatedly produced with the same duty ratio until the counter 42 is renewed by generation of next FG output pulse.

The reason for dividing the 8 bit output of the counter 42 into the higher order 4 bits and the lower order 4 bits to produce the PWM signals is that response speed of speed servo is increased by shortening the period of the PWM signal. If the PWM signal was not divided into the higher order bits and the lower order bits, the PWM signal provided would be a signal obtained by dividing the period of the PWM signal by 256 which corresponds to numerical value which can be expressed with 8 bits and maintaining the state "H" during a period of time corresponding to numerical value expressed by the 8 bit output of the counter 42. If the length of one divided section is the same, the PWM signal which is not divided into the higher order bits and the lower order bits has a period which is $256/16=16$ times as long as the period of the PWM signal which is divided into the higher order bits and the lower order bits (it is sufficient if the period is divided by 16). If the period is longer, the response speed of the servo loop is affected to that extent. This is why the output of the counter 42 is divided into the higher order bits and the lower order bits to produce the PWM signals. Since the higher order 4 bits have weight which is 16 times as large as the lower order 4 bits, weight which is 16 times as large as that of the PWM signal CFL′ is given to the PWM signal CFH′ as will be described later when the motor 10 is driven by the PWM signals CFH′ and CFL′.

Specific examples of circuits for driving a brush motor and a brushless motor by the driving circuit of FIG. 1 will now be described.

Figure 8:
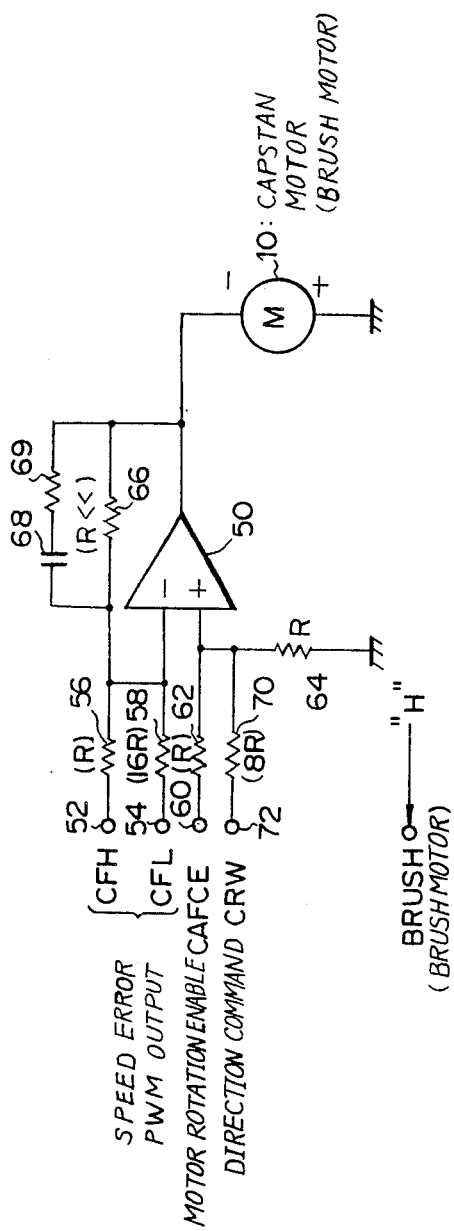
FIG. 8 is a diagram showing an example of a circuit driving a brush motor using the driving circuit of FIG. 1.

FIG. 8 shows an example of a circuit in the case where a brush motor is used as the capstan motor 10. This circuit comprises an adding amplifier 50. The PWM signals CFH and CFL are supplied to input terminals 52 and 54 and an input terminal of the adding amplifier 50 through resistances 56 and 58. The resistance 56 has resistance value which is 1/16 of resistance value of the resistance 58 whereby the PWM signals CFH and CFL are weighted at a ratio of 16 to 1 in terms of current.

The motor rotation enable signal CAFCE is applied to an input terminal 60, voltage-divided into half through resistances 62 and 64 and thereafter is applied to the non-inverting input terminal of the amplifier 50. This voltage provides a speed target value. If the "H" level of the PWM signals CFH and CFL and the motor rotation enable signal CAFCE is 5 V, the average level of the PWM signals CFH and CFL at the regular speed is 2.5 V (the counter 42 of FIG. 5 is so set that, as described above, its count reaches ½ the maximum count when the motor speed is the regular speed so that the sum signal of the PWM signals CFH and CFL corresponds to a signal with duty ratio of 50%), and, accordingly, by imparting voltage 2.5 V obtained by voltage-dividing the motor rotation enable signal CAFCE by the resistances 62 and 64 as the reference voltage, the speed serve works so as to bring the motor speed to the regular speed.

The gain of the adding amplifier 50 is set at a large value by resistance 66 and the capstan motor 10 is driven by the output of the adding amplifier 50. Capacitor 68 and resistance 69 are provided for phase-compensation in the high frequency region.

Figure 9A:
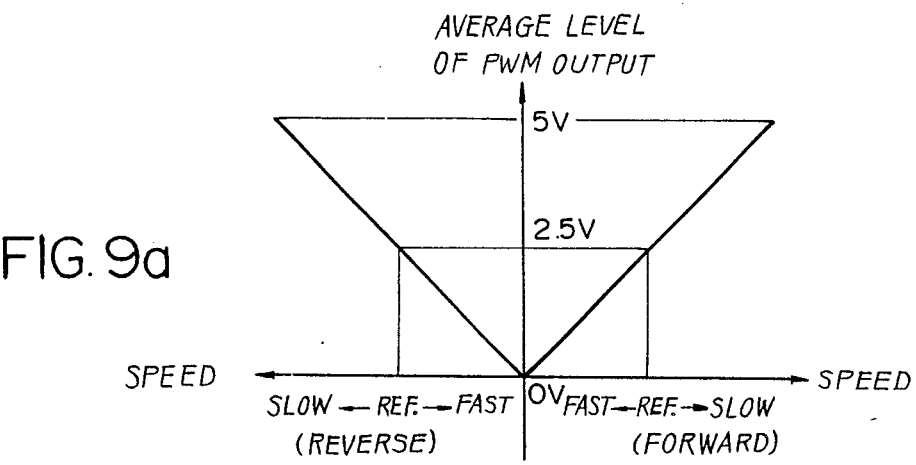
FIGS. 9a through 9c are diagrams for explaining operation of the circuit shown in FIG. 8.

The operation of the circuit of FIG. 8 will be described with reference to FIGS. 9a through 9c. FIG. 9a shows the negative input voltage to the inverting input of the amplifier 50, i.e., the average level of the sum signal of the PWM signals CFH′ and CFL′, when the inverting operation by the exclusive OR gates 26 and 28 is not taken into consideration. The input level which is 2.5 V (duty ratio 50%) at the regular speed decreases with decreased duty ratio as the speed increases from the regular speed and increases with increased duty ratio as the speed decreases from the regular speed.

Figure 9B:
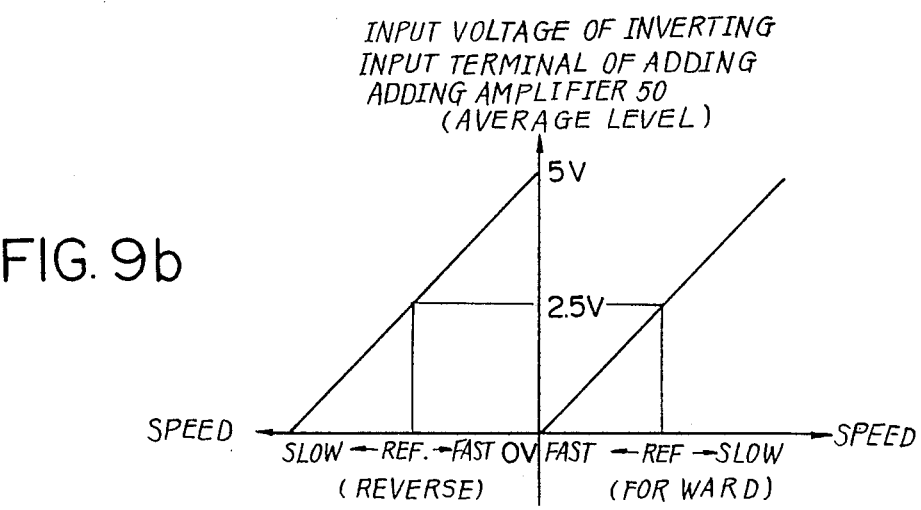

FIG. 9b shows the input voltage to the inverting input terminal of the adding amplifier 50 when the inverting operation by the exclusive OR gates 26 and 28 (i.e., inversion occurring when the motor is driven in reverse direction) is taken into consideration. In this case, characteristics of the reverse rotation side are inverted as compared with FIG. 9a.

Figure 9C:
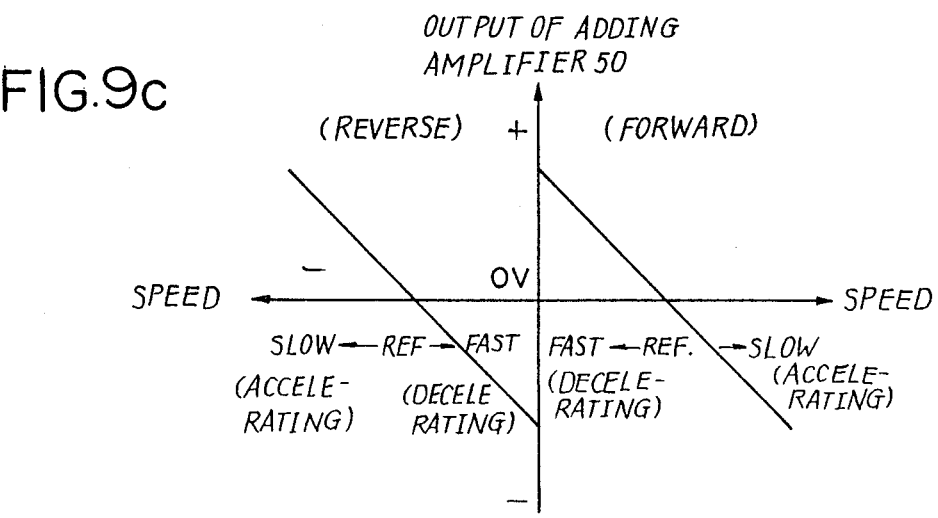

FIG. 9c shows the output of the adding amplifier 50. The input voltage to the inverting input terminal is shifted by the voltage applied to the non-inverting input terminal so that the output of the adding amplifier 50 is 0 V at the regular speed. By driving the motor 10 (brush motor) by this output of the adding amplifier 50 shown in FIG. 9c, the speed servo works so that the motor speed is brought to the regular speed both in forward and reverse rotations of the motor 10.

Figure 10:
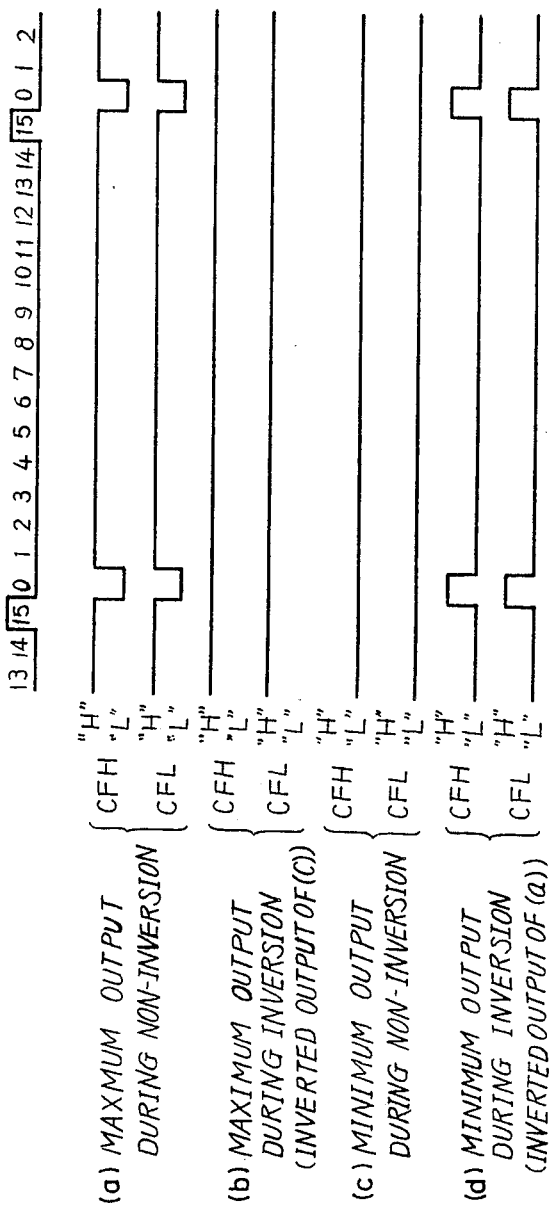
FIG. 10 is a diagram for explaining the reason why offset is produced when the PWM signals are inverted.

Resistance 70 in FIG. 8 is provided for cancelling offset produced when the PWM signals are inverted. More specifically, as shown in FIG. 10, the maximum output of the PWM signals when they are not inverted is 255 counts ($15\times16+15$) in terms of the count of the counter 42 as shown in state (a) of FIG. 10 whereas the maximum output thereof when the PWM signals are inverted is 272 counts ($16\times16+16$) as shown in state (b) of FIG. 10. The minimum output of the PWM signals when they are not inverted is 0 count as shown in state (c) of FIG. 10 whereas the minimum output thereof when the PWM signals are inverted is 17 counts ($1\times16+1$) as shown in state (d) of FIG. 10. Accordingly, offset of 17 counts is produced when the PWM signals are inverted. In the circuit of FIG. 8, therefore, the direction command CRW ("H" =5 V during reverse rotation and "L" =0 V during forward rotation) is applied at an input terminal 72 to cancel the offset by raising the input of the non-inverting input terminal of the adding amplifier 50 by 1/17 during reverse rotation as compared with forward rotation.

Figure 11:
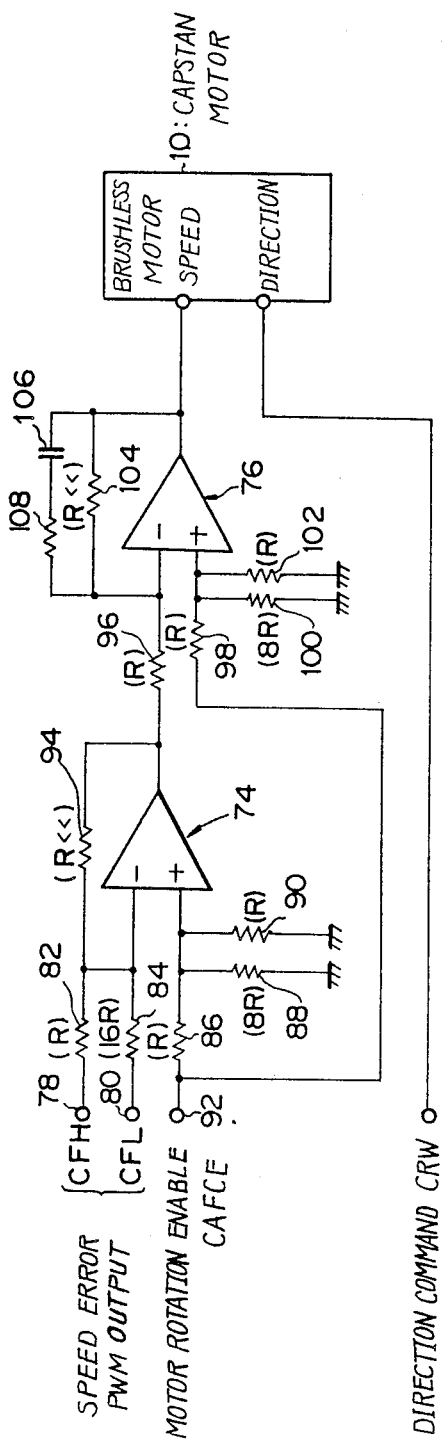
FIG. 11 is an example of a circuit driving a brushless motor using the driving circuit of FIG. 1.

FIG. 11 shows a servo circuit used when a brushless motor is used as the capstan motor 10. In this circuit, two amplifiers 74 and 76 are connected in series.

The amplifier 74 is an adding amplifier. The PWM signals CFH and CFL are applied to input terminals 78 and 80 and added together after being weighted at a ratio of 16: 1 by resistances 82 and 84. The sum signal is applied to the inverting input terminal of the adding amplifier 74. The motor rotation enable signal CAFCE is applied from an input terminal 92 and a voltage obtained by voltage-dividing it with resistance 86 and parallel resistances 88 and 90 is applied to the non-inverting input terminal of the adding amplifier 74 as a reference voltage. The gain of the adding amplifier 74 is set at a relatively large value by resistance 94. Resistance 88 is provided for the same purpose as the resistance 70 in FIG. 8.

The output of the adding amplifier 74 is applied to an inverting input terminal of the amplifier 76. To the non-inverting input terminal of the amplifier 76 is applied, as a reference voltage, a voltage obtained by voltage-dividing the motor rotation enable signal CAFCE with resistance 98 and parallel resistances 100 and 102. The gain of the amplifier 76 is set at a relatively large value by resistance 104. Capacitor 106 and resistance 108 are provided for phase-compensation in the high frequency region. The motor 10 is controlled in its speed by the output of the amplifier 76 and also controlled in its rotation direction by the direction command CRW.

Figure 12A:
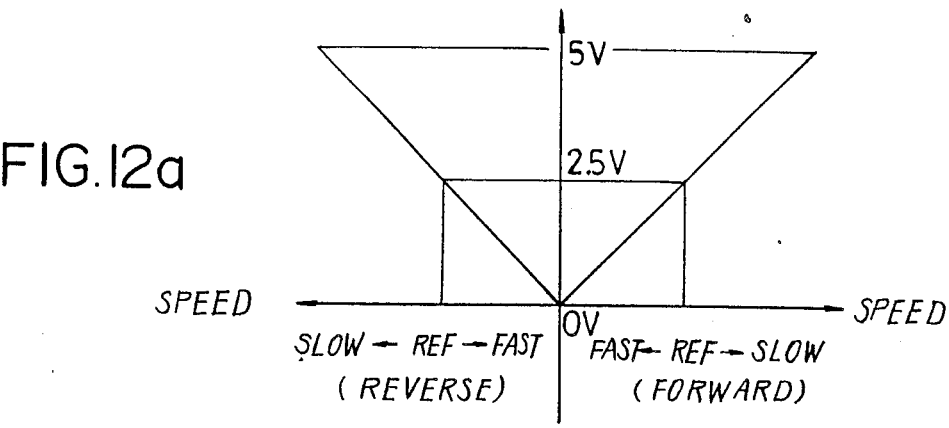
FIGS. 12a through 12c are diagrams for explaining operation of the circuit shown in FIG. 11.

The operation of the circuit of FIG. 11 will be described with referene to FIGS. 12a through 12c. FIG. 12a shows the input voltage to the inverting input terminal of the adding amplifier 74, i.e., the average level of the sum signal of the PWM signals CFH and CFL. This input voltage which is 2.5 V (duty ratio 50%) at the regular speed decreases with decreased duty ratio as the speed increases from the regular speed whereas it increases with increased duty ratio as the speed decreases.

Figure 12B:
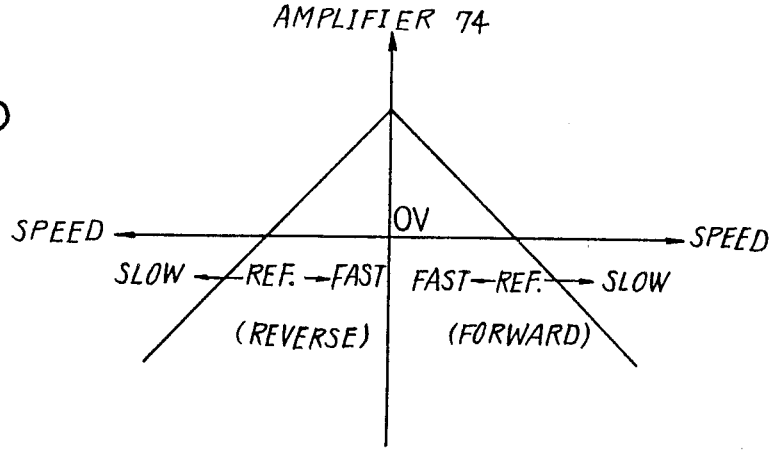
Figure 12C:
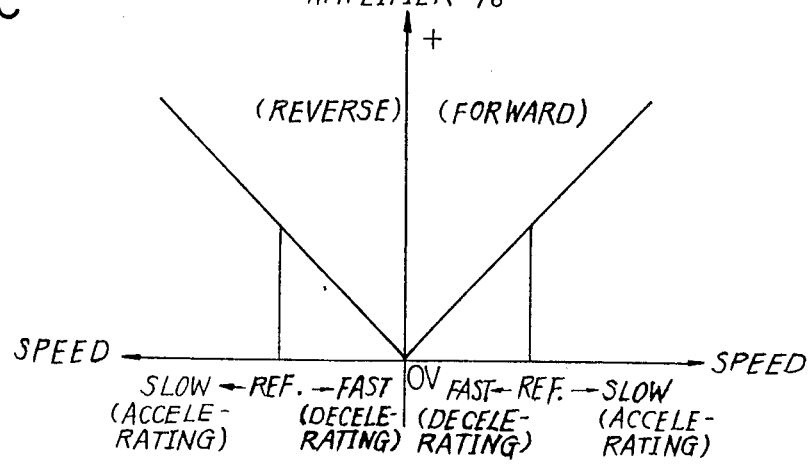

FIG. 12b shows the output of the adding amplifier 74. The input voltage to the inverting input terminal of the amplifier 74 is shifted by 2.5 V by voltage applied to the non-inverting input terminal of the amplifier 74 and inverted by the amplifier 74. FIG. 12c shows the output of the adding amplifier 76. The input voltage to the inverting terminal of the amplifier 76 is shifted by 2.5 V by voltage applied to the non-inverting input terminal of the adding amplifier 76 and inverted by the amplifier 76. By driving the motor 10 (brushless motor) by this output of the amplifier 76, the speed servo works to bring the motor speed to the regular speed both in forward and reverse rotations.

In the embodiment of FIG. 1, the common output terminal is used and its output is switched by the exclusive OR gates 26 and 28 depending upon whether the motor used is a brush motor or a brushless motor. Alternatively, outputs for a brush motor and a brushless motor may be directed in parallel to two separate output terminals and one of the output terminals may be selected depending upon the type of the motor used.

In the above described embodiment, description has been made about the case where the invention has been applied to R-DAT but the invention is applicable also to other devices.

What is claimed is:
1. A motor driving circuit comprising:
   a motor type selection circuit for producing a signal representing a type of motor which has been selected;
   a motor speed detection circuit for producing a speed detection information signal corresponding to the rotation speed of said motor;
   a motor speed command circuit for producing a motor speed command signal;
   a motor rotation direction command circuit for producing a motor rotation direction command signal;
   a speed error detection circuit for detecting a speed error between actual speed and commanded speed of said motor in response to the speed detection information signal and the speed command signal and producing a speed error signal in accordance with result of the detection; and
   an inversion circuit connected to the output side of said speed error detection circuit for selectively inverting or non-inverting the speed error signal in response to states of the signal representing the type of the motor and the motor rotation direction command signal,
   said motor being driven by the motor rotation direction command signal and the output of said inversion circuit.

2. A motor driving circuit as defined in claim 1 wherein said motor type selection circuit designates either a brush motor or a brushless motor and produces a signal corresponding to the designated type of motor, the speed error signal being inverted in said inversion circuit when the brush motor has been selected on condition that the motor rotation direction command is either one of forward rotation and reverse rotation.

3. A motor driving circuit as defined in claim 2 wherein said speed error detection circuit counts a pulse of a predetermined frequency within a predetermined time interval of FG output pulse generated in accordance with rotation of the motor and produces the speed error signal in accordance with count of the pulse.

4. A motor driving circuit as defined in claim 3 wherein said count is divided into higher order bits and lower order bits, the pulse signal of the predetermined frequency is pulse-width modulated in these divided bits and average analog signals thereof are weighted in either the higher order bits or the lower order bits at a predetermined ratio and added together, said motor being driven by the sum signal of said addition.

5. A motor driving circuit comprising:
   a motor type selection circuit for producing a signal representing a type of motor which has been selected;
   a motor speed detection circuit for producing a speed detection information signal corresponding to the rotation speed of said motor;
   a motor speed command circuit for producing a motor speed command signal;
   a motor rotation direction command circuit for producing a motor rotation direction command signal;
   a speed error detection circuit for detecting a speed error between actual speed and commanded speed of said motor in response to the speed detection information signal and the speed command signal and producing a speed error signal in accordance with result of the detection; and an inversion circuit connected to the output side of said speed error detection circuit for inverting the speed error signal, said motor being selectively driven by the motor rotation direction command signal and one of the speed error signal or inverted speed error signal.

* * * * *